United States Patent [19]

Frayer et al.

[11] 4,116,817
[45] Sep. 26, 1978

[54] HYDRODESULFURIZATION PROCESS EMPLOYING A PROMOTED CATALYST

[75] Inventors: James Albert Frayer, Pittsburgh; Henri K. Lese, Monroeville; Joel Drexler McKinney, Pittsburgh; Kirk J. Metzger, Pittsburgh; John Angelo Paraskos, Pittsburgh, all of Pa.

[73] Assignee: Gulf Research & Development Company, Pittsburgh, Pa.

[21] Appl. No.: 810,857

[22] Filed: Jun. 28, 1977

[51] Int. Cl.² ............................................. C10G 23/02
[52] U.S. Cl. ..................................... 208/210; 208/216
[58] Field of Search ............... 208/210, 216 R, 216 PP

[56] References Cited

U.S. PATENT DOCUMENTS

| | | | |
|---|---|---|---|
| 3,674,680 | 7/1972 | Hoekstra et al. | 208/216 R |
| 3,968,027 | 7/1976 | Frayer et al. | 208/210 |
| 3,985,643 | 10/1976 | Milstein | 208/210 |
| 3,990,964 | 11/1976 | Gustafson | 208/216 PP |
| 4,028,227 | 6/1977 | Gustafson | 208/216 PP |

Primary Examiner—George Crasanakis

[57] ABSTRACT

An asphaltene-containing oil hydrodesulfurization process employing an upstream catalyst and a downstream catalyst in series. The downstream catalyst comprises supported Group VI and Group VIII metals together with a promoting amount of Group IV-B metal in the form of particles whose surface is shaped by multiple elongated alternating grooves and protrusions. The upstream catalyst comprises Group VI and Group VIII metals without promotion with Group IV-B metal in the form of particles which may or may not be similarly shaped. Beds of the downstream and upstream catalyst may be diposed in the same or in different reactors. The adaptation of the grooved particle configuration to the promoted catalyst composition provided the early development of a plateau-like aging curve which was not achieved by the adaptation of the grooved shape to a non-promoted catalyst.

13 Claims, 4 Drawing Figures

Relationship Between Mass Velocity and Catalyst Particle Shape

Effect of Catalyst Particle Shape in Second Stage Hydrodesulfurization

HYDRODESULFURIZATION PROCESS EMPLOYING A PROMOTED CATALYST

This invention relates to a process for the hydrodesulfurization of metal- and sulfur-containing asphaltenic residual oils employing non-promoted and promoted hydrodesulfurization catalysts in series.

The non-promoted catalyst is employed in an upstream zone and the promoted catalyst is employed in a downstream zone of the present process. The particles of the promoted catalyst have a surface provided with at least one groove and at least one protrusion. Preferably, the particles of the promoted catalyst are elongated extrudates whose surface is provided with a plurality of alternating longitudinal grooves and protrusions, as described below. The particles of the non-promoted catalyst can be similarly shaped, if desired, or can have any other form such as a cubical form, as needle-shaped or round granules, as spheres, as cylindrically shaped extrudates, etc. With any of the non-grooved shapes, the smallest surface-to-surface particle dimension extending through the center or axis of the particle is generally between 1/20 and 1/40 inch (0.127 and 0.063 cm), preferably between 1/25 and 1/37 inch (0.102 and 0.071 cm), and most preferably between 1/29 and 1/34 inch (0.087 and 0.075 cm). The size of most or all of the non-grooved particles will be within this range. The dimension characteristics for shaped or grooved particles of this invention are presented below.

The composition of the promoted catalyst of this invention is disclosed in U.S. Pat. No. 3,968,027 to Frayer et al., which is incorporated by reference. This patent, and U.S. Pat. No. 3,968,029 to Frayer et al., both disclose many advantages relating to the use of the promoted catalyst. However, these patents do not disclose the use of a promoted catalyst whose surface is provided with the multi-grooved shape described below. We have now discovered that when the promoted catalyst is used in the form of shaped particles, surprisingly advantageous results are achieved. While a number of patents disclose the use of hydrodesulfurization catalyst particles having a multi-grooved shape, including U.S. Pat. Nos. 3,674,680; 3,764,565; 3,857,780; 3,990,964 and 3,966,644; none of these patents discloses the adaptation of this particle shape to the promoted catalyst as described herein. It is shown below that the adaptation of the multi-grooved particle configuration to the promoted catalyst composition provided the early development of a plateau-like catalyst aging curve which was not achieved by the adaptation of the multi-grooved shape to a non-promoted catalyst. Development of a plateau-like curve in a downstream zone can allow the downstream zone to operate at a lower temperature than the upstream zone.

FIG. 1 compares graphically shaped and cylindrical catalyst particles in a first desulfurization stage.

FIG. 2 compares graphically shaped and cylindrical catalyst particles in a second desulfurization stage.

Figure 1:
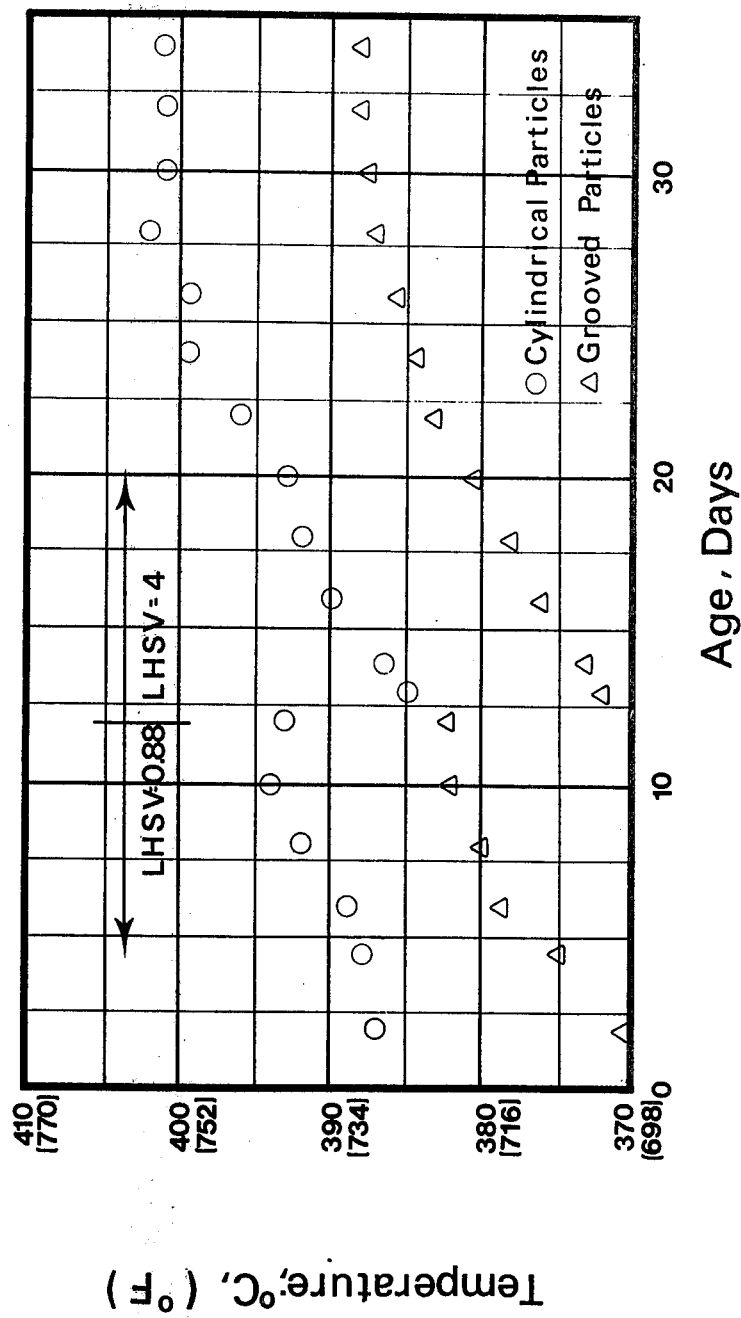

The non-promoted upstream or first series catalyst in the process of this invention is a supported Group VI and Group VIII metal hydrodesulfurization catalyst. Suitable Group VI and Group VIII metal combinations include cobalt-molybdenum, nickel-tungsten and nickel-molybdenum. A preferred combination is nickel-cobalt-molybdenum. The catalyst can comprise 5 to 30 weight percent, generally, and 8 to 20 weight percent, preferably of Group VI and Group VIII metals. The catalyst composition includes a highly porous, non-cracking supporting material. Alumina is the preferred supporting material but other porous, non-cracking supports can be employed, such as silica-alumina, and silica-magnesia. A significant amount or most of the sulfur and metals in the feed oil are removed by this upstream catalyst.

Although the surface of the particles of the first or non-promoted catalyst may or may not be provided with the grooved shape described below, it is essential that the surface of the particles of the second or promoted catalyst be provided with the grooved shape.

The promoted downstream catalyst of the process of this invention can be generally described by the definition of the first series catalyst, except that the second series catalyst is promoted with from one to ten weight percent, generally, and from 2.5 to 8 weight percent, preferably, of a Group IV-B metal, such as titanium, zirconium or hafnium, preferably titanium. The non-promoted catalyst generally differs from the promoted catalyst in that the non-promoted catalyst does not contain a promoting amount of Group IV-B metal. In the promoted catalyst the Group IV-B metal and the Group VI and VIII metals can be impregnated on the surface of the support in the manner disclosed in U.S. Pat. No. 3,840,473, which is hereby incorporated by reference, as contrasted to being incorporated within the supporting material. A solution of titanium tetrachloride in n-heptane can typically be employed for the impregnation. Use of more than 8 to 10 weight percent of Group IV-B metal can be deleterious to hydrodesulfurization activity, as well as being economically wasteful. A molecular monolayer coverage of titanium oxide on commonly employed hydrodesulfurization catalyst supports would deposit about 5 to 8 weight percent of titanium on the catalyst. Use of more than a monolayer would be wasteful and could tend to block catalyst pores and prevent access of large oil molecules to the catalyst interior. On the other hand, less than one weight percent of titanium will not promote the activity of the catalyst.

The shaped catalyst particles are solid and have a surface provided with at least one groove and at least one protrusion. Preferably, these particles are elongated extrudates having multiple alternating elongated straight or curved surface grooves or indentations and protrusions. The number of grooves can be between 1 or 2 and 8, although 3 or 4 are preferred. The grooves form alternating longitudinal projections, which can be rounded, extending along the length of the catalyst particle so that a view of a cross-section taken through the axis of a particle shows a plurality of surface projections which are joined by intersecting to form a unitary catalyst structure, providing particle strength in the intersecting region.

The "diameter" of the catalyst particle can be expressed as twice the shortest surface-to-central axis dimension. The measurement is made from the depth of the crevice which constitutes the deepest surface penetration between protrusions to the central axis of the particle. The "diameter" dimension as defined herein for the shaped catalyst particles of this invention is generally between about 1/15 and 1/60 inch (0.17 and 0.042 cm), preferably between about 1/20 and 1/55 inch (0.127 and 0.046 cm), and most preferably between about 1/25 and 1/50 inch (0.102 and 0.051 cm). The size of most or nearly all of the particles employed will be within this range. The corresponding "radius" dimensions will be one-half of these values, or generally between about 1/30 and 1/120 inch (0.085 and 0.021 cm), preferably between about 1/40 and 1/110 inch (0.064 and 0.023 cm), and most preferably between 1/50 and 1/100 inch (0.051 and 0.025 cm).

It was surprisingly found that when a hydrodesulfurization catalyst with four projections formed by four grooves and having a 1/36 inch (0.07 cm) diameter dimension as defined herein was crushed to destroy the shape configuration of the original particles, thus forming smaller, granular particles 20 to 35 mesh (0.165 to 0.331 inch) (0.0419 to 0.0841 cm) in size, catalyst activity was not increased even though the surface area to volume ratio was increased by said crushing. On the other hand, it was found that crushing of a catalyst of similar composition in the form of cylindrical particles having a conventional diameter of 1/32 inch (0.08 cm) to the same mesh size did increase its activity. It is generally expected that any size reduction will increase catalyst activity because of a concomitant increase in particle surface area to volume ratio. Therefore, the absence of an activity increase due to particle size reduction for the shaped particles indicates that shaped particles within the size range of this invention surprisingly already possess an optimum activity due to particle shape. Since crushing did not increase catalyst activity, it would not be advantageous to employ particles of a smaller size than defined herein because such a smaller size would only tend to increase the pressure drop in the system without a concomitant activity advantage.

Possible reasons for the optimum activity due to particle size of the shaped catalyst of this invention is that the shape of the particle may induce a viscosity- or surface tension-related enhanced liquid hold-up or residence time or enhanced particle liquid wetting capacity in a reactor employing downward or trickle flow, as compared to the liquid residence time or liquid wetting capacity with non-grooved particles. The shaped catalyst of this invention provides multiple points of contact between adjacent particles, thereby minimizing close packing, increasing reactor void volume and increasing the particle zones which can be wetted. It would have been expected that the use of particles which increase reactor void volume would reduce catalytic activity because of the resulting lower volume of catalyst particles in a given volume of reactor space. However, the above-mentioned test comparing the activity of crushed and uncrushed shaped particles of this invention unexpectedly showed that shaped catalyst particles within the size range of this invention do not suffer an activity disadvantage due to a reduced volume of catalyst.

We have found that a shaped catalyst as described herein performs in an unexpectedly advantageous manner at high liquid mass velocities. In a residual oil hydrodesulfurization test, shaped catalyst particles having four grooves and a 1/36 inch (0.07 cm) diameter dimension as defined above provided a 21.6° F. (12° C.) temperature advantage relative to cylindrical particles having a conventional diameter of 1/32 inch (0.08 cm) at a 0.88 liquid hourly space velocity, whereas at a liquid hourly space velocity of 4 the temperature advantage increased to 24.3° F. (13.5° C.), all other process conditions remaining unchanged. Operationally, mass velocity can be increased at any given space velocity by increasing the catalyst bed depth. At a fixed space velocity and a fixed catalyst volume, increasing the catalyst bed depth is equivalent to reducing the diameter of the bed. Therefore, the observed advantage arising from an increased mass velocity renders the shaped catalyst particles particularly advantageous for use in a reactor whose diameter is smaller than the diameter of an associated reactor containing nonshaped particles by an amount which provides a relatively high mass velocity with the shaped catalyst particles. Since mass velocity is defined as the weight of liquid flow per unit area of reactor cross-section per unit time, the mass velocity will increase exponentially with a decrease in reactor diameter at a given space velocity.

The shaped catalyst particles of this invention can be further defined as concave particles, as contrasted to convex particles. A geometric solid is defined as convex if all pairs of points lying within or on the surface of the solid can be connected by a straight line which is completely contained within the surface. Spherical and cylindrical particles are convex. Conversely, a geometric solid is concave if at least one pair of points lying within or on the surface of the solid can be connected by a straight line which is not completely contained within or on the surface of the solid. The geometric volume of the smallest convex solid containing a concave solid will be greater than the geometric volume of the concave solid. Letting $V_x$ equal the volume of the minimum convex solid which can contain a specified concave solid and $V_c$ equal the volume of the contained concave solid, a resulting concavity index factor C can be defined as:

$$C = V_x/V_c$$

A concave geometric solid has a concavity index greater than one. The average concavity index of the shaped catalyst particles of this invention is generally between about 1.01 and 1.35, preferably is between about 1.03 or 1.05 and 1.25, and most preferably is between about 1.10 and 1.20.

The external surface area to volume ratio of the shaped catalyst particles of this invention is generally between about 80 and 200 1/inches (31.1 and 78.7 1/cm), and preferably is between about 100 and 180 1/inches (39.4 and 70.8 1/cm). The internal surface area of the shaped catalyst of this invention can be between about 100 and 350 square meters per gram.

The shaped catalyst particles of this invention will have a total pore volume in the range of about 0.3 to 0.85 cubic centimeters per gram, according to the BET method of measurement, with more than half of the pore volume being in pores having a radius between 50 and 300 A.

As discussed above, the shaped catalyst particles of this invention will provide a higher reactor void volume than cylindrically shaped particles. If $V_p$ equals the volume of each particle, including pore volume, times the number of particles, and $V_r$ equals the volume of the total reactor void space, excluding pore volume, then the void fraction is:

$$V_r/(V_r + V_p)$$

The void fraction in a reactor employing shaped catalyst particles of this invention is between about 0.20 and 0.95, generally, and preferably is between about 0.25 and 0.55.

In the present process, the feed oil initially flows downwardly through a fixed bed of non-promoted catalyst. The non-promoted catalyst removes a significant amount of the feed metals and sulfur from the oil. The oil is then passed downwardly through a fixed bed of promoted catalyst. Very little hydrocracking occurs in the combination process. Most of the product oil boils above the initial boiling point of the feed oil, generally, and preferably at least 70, 80 or 90 weight percent of the total product boils above the initial boiling point of the feed oil.

The hydrodesulfurization process of this invention employs a hydrogen partial pressure of 1,000 to 5,000 psi (70 to 350 kg/cm$^2$), generally, 1,000 to 3,000 psi (70 to 210 kg/cm$^2$), preferably, and 1,500 to 2,500 psi (105 to 175 kg/cm$^2$), most preferably.

The gas circulation rate can be between 1,000 and 20,000 SCF/B (17.8 and 356 SCM/100L), generally, or preferably about 2,000 to 10,000 SCF/B (35.6 to 178 SCM/100L). The gas circulated preferably contains 85 percent or more of hydrogen. The mol ratio of hydrogen to oil can be between about 4:1 and 80:1. Reactor temperatures can vary between about 600° and 900° F. (316° and 482° C.), generally, and between 650° and 800° F. (343° and 427° C.), preferably. Reactor temperatures are increased during a catalyst cycle to compensate for catalyst activity aging loss. The temperature should be sufficiently low so that not more than 30 percent, generally, and preferably not more than about 10, 15 or 20 weight percent of the 650° F.+ (343° C.+) feed oil will be cracked to material boiling below 650° F. (343° C.). The liquid hourly space velocity in each reactor can be between about 0.1 and 10, generally, and between about 0.2 and 1.25, preferably, volumes of oil per hour per volume of catalyst.

The feed oil to the process of this invention can be a full petroleum crude or an atmospheric or vacuum tower reduced crude containing substantially all of the residual asphaltenes of the full crude. The process is also useful for desulfurizing other asphaltene-containing oils, such as coal liquids and oils extracted from shale and tar sands. Asphaltenes have a relatively low hydrogen to carbon ratio as compared to lower boiling oils and will generally contain most of the metallic components present in the total feed, such as nickel and vanadium. Since most desulfurization catalysts have a high activity for demetallization as well as for desulfurization, the non-promoted first series catalyst will remove a significant amount of the nickel and vanadium from the charge stock as well as a significant amount of the sulfur. These metals tend to deposit on the catalyst and to reduce the desulfurization activity of the catalyst. Removed nickel and vanadium will account for the ultimate deactivation of the first series catalyst, while coke deposition will contribute very little to deactivation of the first series catalyst.

Since atmospheric or vacuum reduced crudes contain substantially the entire asphaltene fraction of the crude from which they are derived, they typically contain 95 to 99 weight percent or more of the nickel and vanadium content of the full crude. The nickel, vanadium and sulfur content of petroleum residual oils can vary over a wide range. For example, nickel and vanadium can comprise 0.002 to 0.03 weight percent (20 to 300 parts per million), or more, of the oil, while sulfur can comprise about 2 to 7 weight percent, or more, of the oil. In the first or non-promoted catalyst bed, the nickel and vanadium gradually accumulate in the catalyst particle, ultimately causing the catalyst pores to become blocked. Upon blockage of the pores the aging rate of the catalyst ceases to be gradual and the catalyst aging rate increases abruptly to terminate the catalyst cycle.

The Group VI and Group VIII metals which are conventionally employed on hydrodesulfurization catalysts primarily impart desulfurization activity to the catalyst. Group IV-B promoter metals of the second series catalyst of this invention improve the desulfurization activity of Group VI and Group VIII catalytic metals, but Group IV-B metals are relatively expensive to use and increase the cost of the catalyst. Although the promoted catalyst provides increased desulfurization activity in a first hydrodesulfurization stage, and therefore can be advantageously employed in first stage operation, it was shown in U.S. Pat. No. 3,968,027 that the improvement in desulfurization activity realized when the promoted catalyst is employed in a first hydrodesulfurization stage is much less than the improvement in desulfurization activity realized when the promoted catalyst is employed in a second stage. Furthermore, it was also shown in U.S. Pat. No. 3,968,027 that the relatively smaller advantage of the promoted catalyst over the non-promoted catalyst in a first hydrodesulfurization stage declines with progressive catalyst age, while the relatively larger desulfurization activity advantage of the promoted catalyst over the non-promoted catalyst in the second stage steadily increases with progressive catalyst age. In accordance with the present invention it has now been discovered and is demonstrated below that the second stage aging advantage of the promoted over the non-promoted catalyst is enhanced considerably when the particles of the promoted catalyst are shaped in the manner described above.

A further disadvantage to the use of the promoted catalyst in an upstream bed is the metals deactivation limitation on the life of an upstream catalyst, so that the total weight of sulfur that can be removed with any first stage catalyst is limited by metals deposition on the catalyst. This factor tends to render it less economic to incur the additional cost of the promoted catalyst in the first stage operation.

In accordance with this invention, a bed of the non-promoted catalyst is disposed upstream from a bed of the promoted catalyst. The beds can be disposed in a single reactor, or in separate reactors. When disposed in separate reactors, an advantage is obtained by disposing a gas flashing step between a first non-promoted catalyst stage and a second promoted catalyst stage. Most of the metals and sulfur can be removed from the feed oil in the first stage. The oil is then passed to the second stage for removal of the more refractory sulfur. In the second stage, the primary cause of catalyst deactivation is coking. Desulfurization severity is greater in the second stage than in the first stage, and it is known that catalyst coking increases with desulfurization severity. In prior art two-stage residual oil hydrodesulfurization processes employing non-promoted catalysts with an interstage flashing step for removal of contaminant by-product gases, such as hydrogen sulfide, ammonia and gaseous hydrocarbons, and with progressively increasing temperatures in each stage to compensate for catalyst aging, it was commonly expected that both the catalyst aging rate and coke formation on the catalyst would be considerably greater in the second stage than in the first stage. This high second stage coking phenomenon can probably be explained on a molecular basis. In the first stage, the existence of peripheral alkyl groups on feed asphaltene and resin molecules provides steric hindrance which tends to prevent contact of the polycondensed ring inner body of the residual molecules with the catalyst. However, the most refractory sulfur in the asphaltene molecules is not removed in the first stage and must be removed in a second stage. This sulfur is more refractory because it tends to be deeply imbedded within the aromatic nucleus. Following the elimination of some of the alkyl groups in the first stage, the molecules entering the second stage are sterically better adapted to permit the aromatic nucleus to abut broadly against catalyst sites exposing the carbon atoms and ultimately the imbedded sulfur more intimately to the catalyst surface, thereby inducing coking. This mechanism probably accounts for the enhanced catalyst coking and higher aging rates in the second stage, as compared to the first stage.

It was shown in U.S. Pat. No. 3,968,027 that in a second desulfurization stage the promoted catalyst exhibits an improved desulfurization activity with a greatly inhibited coke make and improved catalyst aging characteristics. In addition to the improved second stage desulfurization activity and the improved second stage aging rate with the promoted catalyst, it was also shown in U.S. Pat. No. 3,968,027 that a given degree of desulfurization can be achieved with a substantially lower consumption of hydrogen with the promoted catalyst in the second stage, as compared to the use of a non-promoted catalyst in the second stage. This hydrogen savings accords with data showing that the promoted catalyst in the second stage is considerably more selective towards the desulfurization reaction than is the non-promoted catalyst so that the promoted catalyst induces considerably less side reactions, such as hydrogenolysis, aromatics saturation, metals removal, etc.

Since the promoted and the non-promoted catalysts are both subject to a metals-limited catalyst life cycle in a first desulfurization stage, and since the desulfurization advantage for the promoted catalyst in first stage operation is relatively small and decreases with catalyst age, the promoted catalyst is not employed as an upstream catalyst of this invention. Instead, the less costly non-promoted catalyst is employed as an upstream catalyst. Since the downstream catalyst life cycle is coke-limited and since the particular advantage of the promoted catalyst is its high resistance against coking, the promoted catalyst is employed in a downstream stage, or downstream in a first stage, preceded by a bed of non-promoted catalyst. In either case, the feed oil is first passed over a sufficient quantity of non-promoted hydrodesulfurization catalyst to accomplish significant removal of its sulfur and metals content, and is then passed in series over the promoted catalyst, wherein additional sulfur is removed, which sulfur is considerably more refractory. Thereby, the cheaper non-promoted catalyst is utilized in an early stage in which metals deactivation is controlling, while the more expensive promoted catalyst is utilized in a laser stage in which coke deactivation is controlling, since the promoted catalyst is capable of inhibiting coking to a much greater extent than the non-promoted catalyst.

A further advantage can be obtained from the promoted catalyst in the second stage because it is relatively protected from the cycle-limiting effect of metals deactivation. It was indicated in U.S. Pat. No. 3,968,027 that the promoted catalyst undergoes rapid autoregeneration in a second stage operation by in situ removal of surface coke upon an increase in hydrogen pressure. If the promoted catalyst is onstream in a second stage for a period of time at a first hydrogen partial pressure, followed by a period of operation at a relatively higher hydrogen partial pressure, and then is returned to operation at the first hydrogen pressure, it was found that the catalyst exhibits a higher activity upon its return to the lower hydrogen pressure. The higher activity is evidenced by a reduced temperature requirement for a given degree of desulfurization upon return of the catalyst to the initial hydrogen pressure. The promoted catalyst catalyzes addition of hydrogen to surface coke with elevation of hydrogen pressure so as to solubilize a portion of the surface coke and thereby partially regenerate the catalyst. It was found that the promoted catalyst exhibits an improved kinetic effect for catalytic coke reduction upon an increase of hydrogen pressure, as compared to non-promoted catalyst. Tests demonstrated that the time requirement to improve the activity of a second stage non-promoted catalyst by an elevation in hydrogen pressure is considerably longer than is required by the promoted catalyst. Therefore, the promoted catalyst can provide an advantage in second stage operation not only by initially inhibiting coke formation but also by catalyzing coke removal from the catalyst via hydrogenation to solubilize the coke and mobilize it into a flowing process oil stream. In order to reactivate the second stage catalyst, the hydrogen partial pressure should be increased at least 50 psi (3.5 kg/cm$^2$), generally, and at least 150 psi (10.5 kg/cm$^2$), preferably, and the second stage should be operated at the higher pressure for at least 24 hours.

Since total pressure in any reactor employing the promoted catalyst is determined by reactor metallurgical limitations, the hydrogen pressure cannot be arbitrarily increased in a commercial operation in order to reduce the coke level on the catalyst. However, the catalytic de-coking effect can be made operational commercially by intermittently increasing hydrogen purity in the promoted catalyst reactor to increase hydrogen partial pressure, without increasing the total reactor pressure. Thereby, the process can be operated for a period of time required for catalyst rejuvenation by utilizing a hydrogen feed stream having an elevated hydrogen partial pressure at a constant total pressure. After the coke level is reduced, process operation can be returned to the lower hydrogen partial pressure with the promoted catalyst in a more active condition. This operation can be repeated a number of times to extend the total life of the promoted catalyst.

It is noted that it is not generally possible to successfully regenerate conventional residual oil hydrodesulfurization catalysts by combustion methods. Such catalysts contain at least some vanadium deposited by the feed oil and it is believed that during combustion in the presence of sulfur, vanadium sulfates are formed which coat and permanently deactivate the catalyst.

In the tests of the following examples, the promoted catalyst, regardless of shape, comprised alumina which was impregnated with molybdenum, nickel and titanium, and contained 3 weight percent nickel, 8 weight percent molybdenum and five weight percent titanium, impregnated on an alumina support. The non-promoted catalyst used in the following tests, regardless of shape, contained one-half weight percent nickel, one weight percent cobalt, eight weight percent molybdenum, the remainder being alumina. All cylindrically shaped catalysts tested, regardless of composition, had a conventional surface-to-surface diameter through the axis of the particle of 1/32 inch (0.08 cm), and all shaped catalysts tested, regardless of composition, had four longitudinal alternating projections and grooves on the particle surface providing a concavity index of 1.15, and the dimension of twice the shortest surface-to-central axis distance was 1/36 inch (0.07 cm).

EXAMPLE 1

A test was conducted to illustrate the discovered mass velocity effect demonstrated by shaped catalyst particles. In this test, separate portions of a 650° F.+ (343° C.+) Kuwait ATB containing 3.8 weight percent sulfur were hydrodesulfurized at a hydrogen pressure of 1,950 psi (136.5 kg/cm$^2$) employing a hydrogen rate of 7,400 SCF/B (133.2 SCM/100L). One portion of the feed oil was passed downwardly in trickle flow with hydrogen through one first stage reactor containing non-promoted catalyst particles of cylindrical shape as described above. The other portion of the feed oil was passed downwardly in trickle flow with hydrogen through another first stage reactor of the same size containing non-promoted shaped catalyst particles as described above.

At the start of the test the liquid hourly space velocity in each reactor was 0.88 volumes of liquid per hour per volume of catalyst. The temperature in each reactor was increased gradually with catalyst age so that a constant liquid product containing 0.95 weight percent of sulfur was recovered from each reactor. Reactant flow was continued through each reactor for about 12 days at the indicated space velocity whereupon the space velocity was increased to 4, so that the mass velocity also increased. At the higher space velocity the temperature in each reactor was similarly gradually increased with catalyst age so that a constant liquid product containing 2.4 weight percent of sulfur was recovered from each reactor.

FIG. 1 shows the temperature requirements in each reactor over the period of these tests. FIG. 1 shows that throughout the tests the temperature requirement in the reactor containing the shaped catalyst particles was lower than the temperature requirement in the reactor containing the cylindrical catalyst particles, indicating a relatively higher catalytic activity for the shaped catalyst particles. FIG. 1 contains the additional surprising showing that the temperature advantage in favor of the shaped catalyst was higher at the higher space velocity. For example, just prior to the increase in space velocity the temperature advantage in favor of the shaped catalyst was 21.6° F. (12° C.), while the average temperature advantage in favor of the shaped catalyst at the first three data points after the space velocity change was 24.3° F. (13.5° C.). Therefore, the temperature advantage for the shaped catalyst was found to increase significantly with an increase in mass velocity through the system, indicating than an advantageous effect can be achieved when utilizing the shaped catalyst particles of this invention in a reactor of relatively small diameter, since any reduction in reactor diameter will induce an exponential increase in mass velocity at a given space velocity.

EXAMPLE 2

Comparative tests were conducted to illustrate the discovered mass velocity effect demonstrated by the shaped catalyst particles in a second stage hydrodesulfurization operation utilizing a promoted catalyst. The feed oil in each test was the effluent obtained from a first hydrodesulfurization stage in which Kuwait ATB containing 3.8 weight percent sulfur was hydrodesulfurized to a 1.09 weight percent sulfur level. In these tests, individual portions of the first stage effluent together with 4,000 SCF of hydrogen per barrel (73 SCM/100L) were respectively passed downwardly in trickle flow over separate beds of cylindrical and shaped promoted catalysts, as described above, for a period of more than 50 days at 1 LHSV and at a pressure of 2,100 psi (147 kg/cm$^2$), to accomplish about 71 percent desulfurization. At the end of this period, the shaped catalyst was 15° F. (8.3° C.) more active than the cylindrical catalyst when producing a desulfurized product containing 0.37 weight percent sulfur. The liquid space velocity was then increased to 3.99, effecting a fourfold increase in mass velocity. The temperature in each reactor was then adjusted to produce a product containing 0.65 weight percent sulfur. Under these conditions, the shaped catalyst was 22° F. (12.2° C.) more active than the cylindrical catalyst, whereas the expected activity difference was only 16° F. (9° C.). This demonstrates that in second stage operation the activity of the shaped promoted catalyst is improved to an unexpectedly great extent by an increase in mass velocity, as compared to a similar but non-promoted catalyst.

EXAMPLE 3

Tests were conducted to illustrate the advantageous effect of shaped promoted catalyst particles as described above in a second stage residual oil hydrodesulfurization reactor, as compared to the operation of a similar second stage hydrodesulfurization reactor operated under similar conditions except that cylindrically shaped promoted catalyst particles as described above were utilized. The feed oil employed in each test was a topped 650° F.+ (343° C.+) residual oil containing 1.09 weight percent sulfur which was the effluent obtained from single stage hydrodesulfurization of a 650° F.+ (343° C.+) Kuwait ATB containing 3.8 weight percent sulfur with a non-promoted catalyst.

The tests were performed in individual reactors of equal diameter with the feed oil being passed downwardly in trickle flow over the catalyst. In each test, the LHSV was 1.0 volume of oil per hour per volume of catalyst, the hydrogen pressure was 2,100 psi (147 kg/cm$^2$) and the hydrogen rate was 4,000 SCF/B (72 SCM/100L). The temperature was gradually increased with catalyst age in each test to produce a liquid product containing 0.32 weight percent sulfur.

Figure 2:
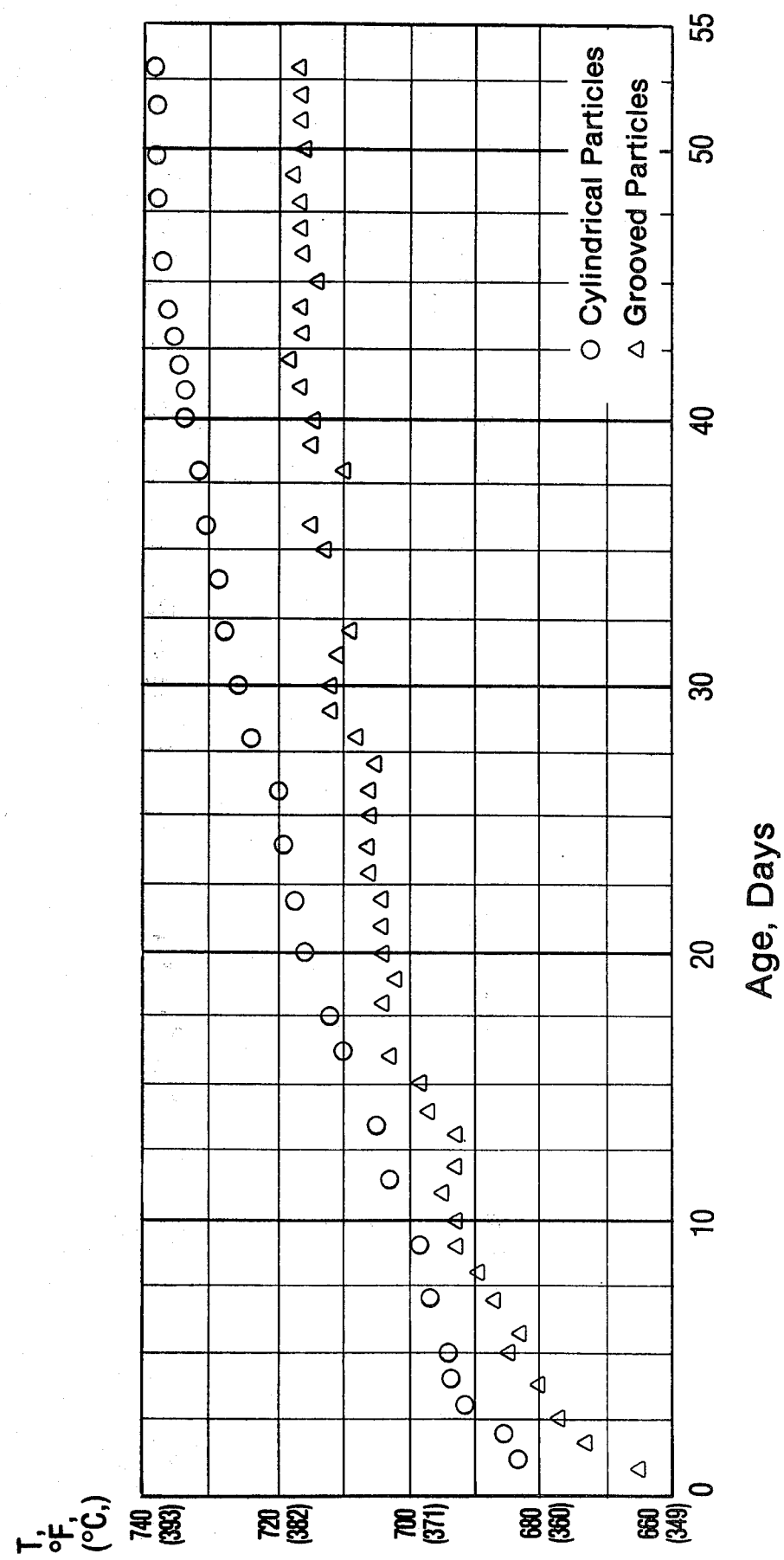

FIG. 2 shows the temperature requirements in each reactor over the test period. FIG. 2 shows that throughout the test period the temperature requirement in the reactor containing the shaped catalyst was lower than the temperature requirement in the reactor containing the cylindrical catalyst, indicating a relatively higher catalytic activity for the shaped catalyst. Moreover, FIG. 2 surprisingly shows that the relative temperature advantage in favor of the shaped catalyst increases with increasing catalyst age. For example, the relative temperature advantage for the shaped catalyst was 10° F. (5.5° C.) at a catalyst age of 5 days and increase somewhat to 12° F. (6.6° C.) at a catalyst age of 20 days. The temperature advantage increased slightly to 13° F. (7.2° C.) at 30 days. However, at 40 days the temperature advantage increased drastically to 19° F. (10.5° C.). Finally, at 53 days the temperature advantage in favor of the shaped catalyst widened to 21° F. (11.7° C.). At 53 days the temperature curve for the shaped catalyst appears essentially flat. In fact, FIG. 2 shows that the temperature curve for the shaped catalyst started to flatten at between 9 and 20 days and maintained a relatively plateau-like configuration after 20 days, whereas the temperature curve for the cylindrical catalyst failed to achieve a plateau during this period. Since, as indicated above, aging of the second stage catalyst is almost entirely due to coke formation, the flattening of the temperature curve for the shaped catalyst indicates that the coke on the shaped catalyst has reached an equilibrium level, i.e. old coke is being removed from the catalyst as rapidly as new coke is being deposited. At the indicated stage of catalyst age, this situation has not been achieved for the cylindrical catalyst. The employment of a relatively small diameter reactor to increase liquid mass velocity over the shaped promoted catalyst will not only provide the mass velocity advantage for the shaped catalyst which was described above, but will also allow the reactor to withstand a higher pressure, and a higher hydrogen pressure, as was also shown above, will encourage a further reduction of coke level on the catalyst.

In contrast to the widening temperature advantage for the shaped promoted catalyst in second stage operation relative to a cylindrical promoted catalyst, as shown in FIG. 2, FIG. 1 fails to show a comparable widening temperature advantage in a first stage residual oil hydrodesulfurization operation employing non-promoted shaped and cylindrical catalysts, nor does it show a comparable plateau-like aging curve for the shaped non-promoted catalyst. Therefore, it is apparent that the advantage illustrated in FIG. 2 for the shaped catalyst is specific to second stage operation employing a catalyst promoted with a Group IV-B metal. Because the second stage promoted catalyst aging curve developed a plateau, a comparison of FIGS. 1 and 2 shows that the promoted shaped catalyst in the second stage permitted a lower operating temperature than prevailed in first stage operation.

EXAMPLE 4

A test was conducted to illustrate the exceptionally high activity of the shaped catalyst particles described above. In performing these tests, a fresh sample of shaped non-promoted catalyst particles as described above was crushed to destroy the particle shape and produce generally spherical particles between 20 and 35 mesh in size (0.0165 to 0.0331 inch) (0.0419 to 0.0841 cm). Crushing increased the surface area to volume ratio from 140 l/inch to 240 l/inch (53 l/cm to 94 l/cm). The hydrodesulfurization activity of the shaped particles was tested for comparison with the hydrodesulfurization activity of the uncrushed shaped particles. For comparative purposes, a fresh sample of non-promoted cylindrical extrudates as described above whose surface area to volume ratio was 145 l/inch (53 l/cm) was crushed to form generally spherical particles between 20 and 35 mesh in size (0.0165 to 0.0331 inch) (0.0419 to 0.0841 cm), having a surface area to volume ratio of about 240 l/inch (94 l/cm). The hydrodesulfurization activity of the crushed cylindrical extrudates was tested for comparison with the hydrodesulfurization activity of the uncrushed cylindrical extrudates. All the hydrodesulfurization tests were performed with a 650° F. (343° C.) Kuwait ATB containing 3.80 weight percent sulfur in first stage downward trickle flow operation at an LHSV of 0.88 volumes of liquid per hour per volume of catalyst to reduce the sulfur content of the oil to a constant sulfur content of 0.95 weight percent. The following table shows the temperature required to maintain this product sulfur level at various catalyst ages.

| Age, days | TEMPERATURE, ° C. | | | |
|---|---|---|---|---|
| | Uncrushed shaped particles | Crushed shaped particles | Uncrushed cylindrical particles | Crushed cylindrical particles |
| 0.5 | — | 363 | — | 366 |
| 1.5 | — | 367 | — | 370 |
| 2.0 | 370.5 | — | 387 | — |
| 2.5 | — | 372 | — | 372 |
| 3.5 | — | 372 | — | 372 |
| 4.0 | — | — | 388 | — |
| 4.5 | 375 | 375 | — | 374 |

The above table shows that the uncrushed cylindrical particles required a temperature about 13° to 16.5° C. higher than was required by the uncrushed shaped particles. This temperature advantage is also illustrated in the aging curve of FIG. 1. While the temperature requirement for the cylindrical particles was reduced considerably by crushing, the table shows that crushing of the shaped particles did not affect the temperature requirement, even though the surface area to volume ratio was increased by crushing. This indicates that the shaped particles, unlike the cylindrical particles, had already achieved an optimum activity based upon particle size. This observation is highly surprising because it has been generally assumed that particle size reduction would automatically increase the activity of a catalyst particle due to an increase in the surface area to volume ratio.

Figure 3:
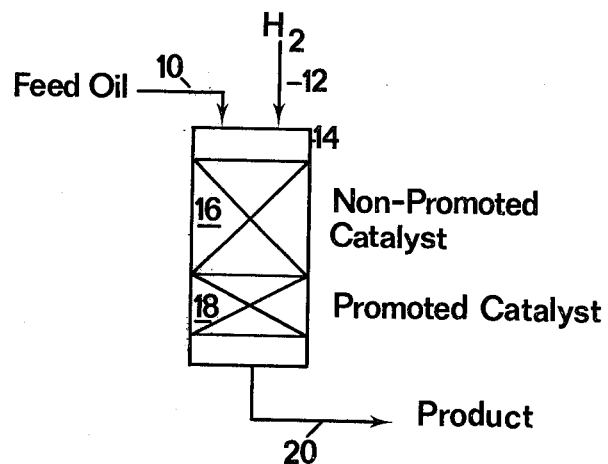
FIG. 3 illustrates an embodiment employing a single hydrodesulfurization reactor.

FIG. 3 shows an embodiment of this invention in which separate beds or layers of non-promoted and promoted catalyst are used in series in one reactor. As shown in FIG. 3, feed oil is charged through line 10 and make-up and/or recycle hydrogen is charged through line 12 to the top of reactor 14. Reactor 14 contains a fixed bed of catalyst in two layers including a top layer 16 of non-promoted catalyst which may or may not be in the form of the shaped particles of this invention. Although the drawing shows most of the catalyst in the reactor is in top layer 16, the amount of catalyst in the top layer can be equal to or less than the amount of catalyst in bottom catalyst layer 18. The bottom catalyst layer 18 comprises shaped particles of promoted catalyst. Desulfurized oil and gases are removed through product line 20.

Figure 4:
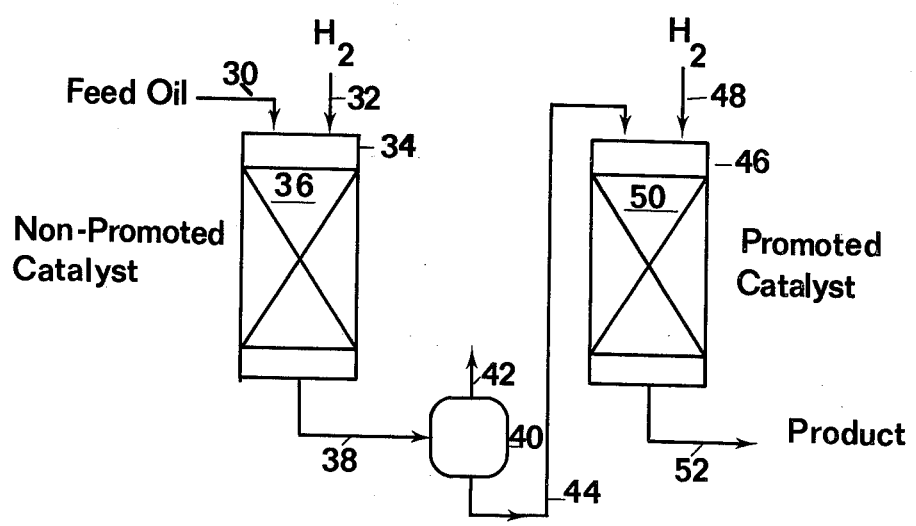
FIG. 4 illustrates a further embodiment in which separate hydrodesulfurization reactors are employed.

FIG. 4 shows another embodiment of this invention in which beds of non-promoted and promoted catalyst are used in series in separate reactors. As shown in FIG. 4, feed oil is charged through line 30 while recycle hydrogen is charged through line 32 to the top of first stage reactor 34 containing a stationary bed 36 of non-promoted catalyst which may or may not be in the form of the shaped particles of this invention. First stage effluent in line 38 is passed to flash chamber 40 from which hydrogen contaminated with hydrogen sulfide and ammonia is removed through line 42 while liquid is removed through line 44 for passage to second stage reactor 46. Make-up and/or recycle hydrogen is charged to reactor 46 through line 48. Second stage reactor 48 contains a stationary bed 50 of promoted catalyst in the form of the shaped particles of this invention. Product is removed from the second stage through line 52.

We claim:

1. In a process for the hydrodesulfurization of an asphaltene-containing oil containing sulfur and metals at a hydrogen pressure between 1,000 and 5,000 psi and a temperature between 600° and 900° F., wherein said oil and hydrogen are passed downwardly in trickle flow through upstream and downstream beds of catalyst particles in series, wherein said catalyst particles in said downstream catalyst bed comprises Group VI and Group VIII metals together with a promoting amount comprising between about 1 and 10 weight percent based on total catalyst weight of Group IV-B metal on a non-cracking support and wherein the catalyst in said upstream catalyst bed comprises Group VI and Group VIII metals on a non-cracking support without said promoting amount of Group IV-B metal, the invention comprising the particles of said promoted catalyst in said downstream bed comprising elongated extrudates which show in cross-section at least one groove defining protrusions and an average concavity index between about 1.01 and 1.35, the shortest distance between the depth of said at least one groove and the center in said cross-section being between about 1/30 and 1/120 inch, said grooving of the promoted catalyst particles allowing a given amount of desulfurization of said oil at a lower temperature as compared with the temperature required for a similar downstream catalyst which is not provided with said grooves, and said temperature in said downstream reactor increasing with increasing catalyst age at a lower rate than the rate of temperature increase for a similar downstream catalyst which is not provided with said grooves.

2. The process of claim 1 wherein the particles of said promoted catalyst are provided with a plurality of grooves defining more than two protrusions.

3. The process of claim 1 wherein said shortest distance is between 1/40 and 1/110 inch.

4. The process of claim 1 wherein said shortest distance is between 1/50 and 1/100 inch.

5. The process of claim 1 wherein oil and hydrogen are passed through said process for more than 20 days.

6. The process of claim 1 wherein the amount of catalyst in said downstream bed is smaller than the amount of catalyst in said upstream bed.

7. The process of claim 1 wherein said upstream and downstream beds of catalyst are disposed in the same reactor.

8. The process of claim 1 wherein said upstream and downstream beds of catalyst are disposed in separate reactors.

9. The process of claim 1 wherein said upstream and downstream beds of catalyst are disposed in separate reactors, and the temperature in said downstream reactor is lower than the temperature in said upstream reactor.

10. The process of claim 1 wherein the promoted catalyst particles have between 2 and 8 longitudinal grooves.

11. The process of claim 1 wherein the promoted catalyst particles have an average concavity index between 1.05 and 1.25.

12. The process of claim 1 wherein the promoted catalyst particles have an average concavity index between 1.10 and 1.20.

13. The process of claim 1 wherein said Group IV-B metal is titanium.

* * * * *